United States Patent
Johnson et al.

[11] Patent Number: 6,149,540
[45] Date of Patent: Nov. 21, 2000

[54] CONTINUOUSLY VARIABLE TRANSMISSION SYSTEM WITH ENGINE BRAKING

[75] Inventors: Mitchell D. Johnson; Gregory G. Lislegard; Michael R. Trihey, all of Roseau; Steven D. Corneliusen, Salol; Joel H. Anderson, Alvarado; Steven L. Johnson, Roseau; Barry Walton, Middle River, all of Minn.; David C. Ochab, Horesheads; Brent Barron, Elmira, both of N.Y.

[73] Assignee: Polaris Industries Inc., Minneapolis, Minn.

[21] Appl. No.: 08/936,191

[22] Filed: Sep. 17, 1997

[51] Int. Cl.[7] .......................... F16H 59/00; F16H 55/56; F16H 9/00
[52] U.S. Cl. ................................. 474/14; 474/46; 474/70
[58] Field of Search .................. 474/13, 14, 46, 474/70, 74, 101, 109, 167, 168, 170

[56] References Cited

U.S. PATENT DOCUMENTS

| | | | |
|---|---|---|---|
| 1,983,827 | 12/1934 | Winther et al. | 74/336.5 |
| 2,269,965 | 1/1942 | Wemp | 192/47 |
| 2,694,937 | 11/1954 | Birbaum | 74/336 |
| 2,764,270 | 9/1956 | Goul | 192/6 |
| 2,917,937 | 12/1959 | Dodge | 74/336 |
| 2,962,910 | 12/1960 | Wolfram | 74/230.17 |
| 3,563,352 | 2/1971 | Stibbe | 192/3.5 |
| 3,893,343 | 7/1975 | Zaiser et al. | 74/230.17 |
| 4,027,544 | 6/1977 | Kobayashi | 474/14 |
| 5,254,041 | 10/1993 | Duclo | 474/14 |
| 5,326,330 | 7/1994 | Bostelmann | 474/14 |
| 5,562,666 | 10/1996 | Peterson | 474/14 |
| 5,597,060 | 1/1997 | Huddleston et al. | 474/14 |
| 5,647,810 | 7/1997 | Huddleston | 474/14 |
| 5,676,225 | 10/1997 | Miyata | 474/74 |
| 5,692,982 | 12/1997 | Peterson | 474/14 |

OTHER PUBLICATIONS

Aaen, Olav; "Clutch Tuning Handbook", 1986; revised 1989, 1993, 1995.

Watt, Duane; "Found, the Missing Half of the Secondary Clutch!"; SnowTech, Sep. 1997; pp. 114–119.

*Primary Examiner*—David A. Bucci
*Assistant Examiner*—Matthew A. Kaness
*Attorney, Agent, or Firm*—Fredrikson & Byron, P.A.

[57] ABSTRACT

A continuously variable transmission (CVT) system for use on snowmobiles, ATV's and similar vehicles. The CVT includes a rotatable drive clutch connected to an input shaft (the input shaft being connectable to an engine), and a roller clutch carried on the input shaft. The CVT also includes a rotatable driven clutch connected to an output shaft, the driven clutch having a laterally stationary sheave and a laterally movable sheave that is normally biased toward the stationary sheave. An endless flexible drive belt is disposed about the drive and driven clutches. The clutches and drive belt are configured so that when the engine is idling the belt firmly engages a drive surface of the roller clutch that is connected to the drive clutch. The roller clutch permits the drive surface (and, therefore, the belt) to remain stationary when the input shaft is rotating, thereby preventing vehicle "creep" when idling, and, yet, the roller clutch also firmly engages the drive clutch's drive surface with the input shaft when the driven clutch attempts to drive the belt faster than the speed at which the drive clutch and input shaft are rotating, thereby permitting the driven clutch to backdrive the input shaft and engine to provide engine braking to the vehicle.

40 Claims, 13 Drawing Sheets

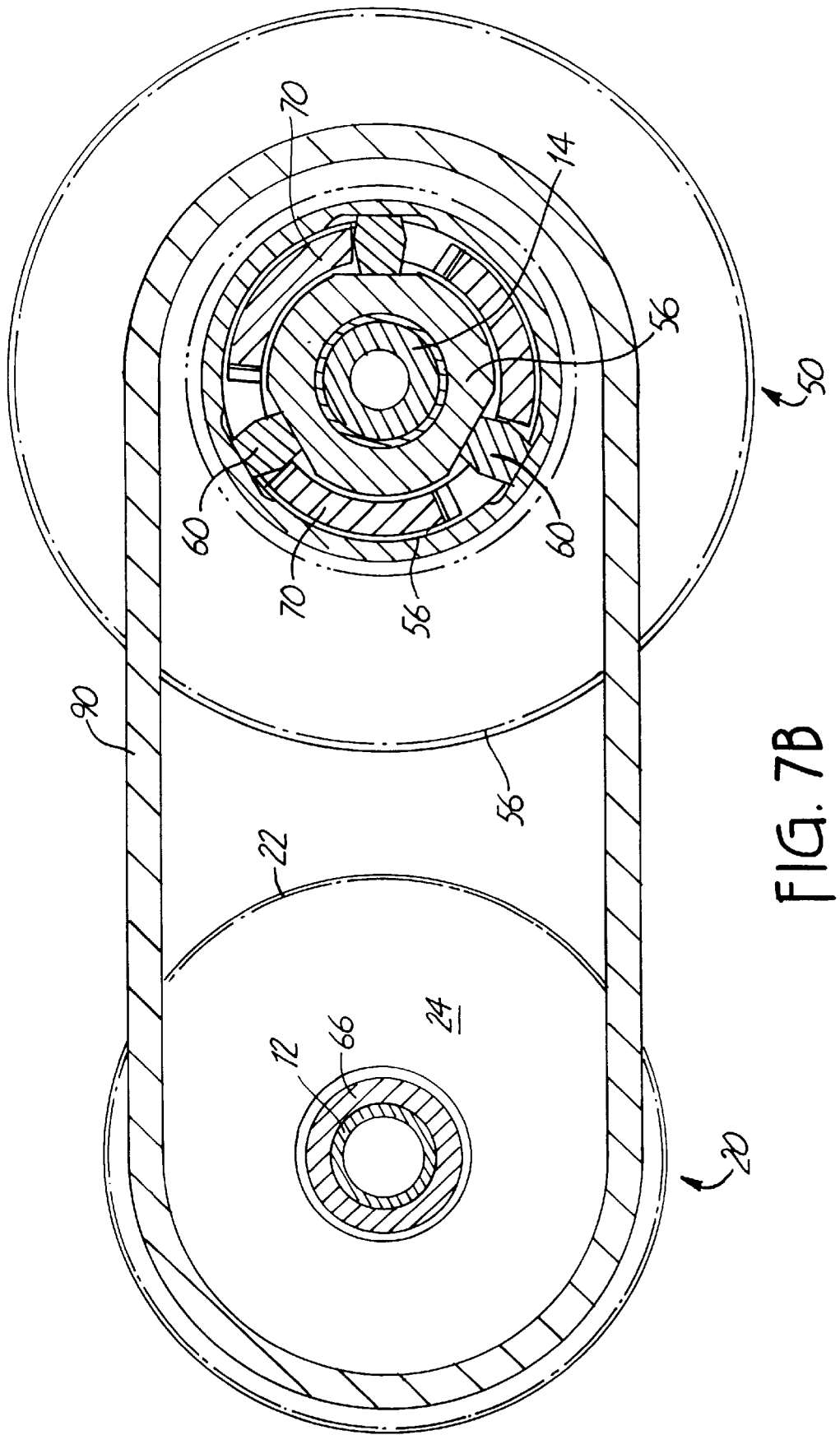

CONTINUOUSLY VARIABLE TRANSMISSION SYSTEM WITH ENGINE BRAKING

TECHNICAL FIELD

The invention relates to vehicle transmission systems, and in particular to a continuously variable transmission system providing engine braking, usable on, e.g., all terrain vehicles (ATV's) or snowmobiles.

BACKGROUND OF THE INVENTION

Continuously variable transmissions (CVT's) are used almost universally in snowmobiles to alleviate any need for the driver to shift the transmission as the vehicle accelerates through its range of speeds. The assignee of the present invention has also successfully utilized CVT's in its line of ATV's. Typically the CVT transmission is connected to the output shaft of the vehicle's engine, the transmission providing continuously variable gear reduction from the relatively higher rotation speed of the engine to the relatively lower rotation speed of the vehicle drive axle. A CVT may be used in conjunction with an additional gear box/transmission, if desired. For example, on ATV's it is desirable to provide a gear box to permit the driver to shift between forward and reverse gears. In such cases a neutral position may also be provided, along with, e.g., an optional low gear for extra power at low speeds. Typically such a gear box is connected to the output shaft of the CVT, the gear box in turn having an output connected by suitable linkages to the drive axle (or axles, in a four or six wheel drive vehicle) of the vehicle. A gear box or transmission may also be utilized for further gear reduction in addition to the reduction provided by the CVT, and other standard drive train components (such as differentials, etc.) may also be utilized between the CVT and the drive axle(s).

Typically a CVT transmission is comprised of a split sheave primary drive clutch connected to the output of the vehicle engine and a split sheave secondary clutch connected (often through additional drive train linkages) to the vehicle axle. An endless, flexible, generally V-shaped drive belt is disposed about the clutches. Each of the clutches has a pair of complementary sheaves, one of the sheaves being laterally movable with respect to the other. The effective gear ratio of the transmission is determined by the positions of the movable sheaves in each of the clutches. The primary drive clutch has its sheaves normally biased apart (e.g., by a coil spring), so that when the engine is at idle speeds the drive belt does not effectively engage the sheaves, thereby conveying essentially no driving force to the secondary driven clutch. The secondary driven clutch has its sheaves normally biased together (e.g., by a torsion spring working in combination with a helix-type cam, as described below), so that when the engine is at idle speeds the drive belt rides near the outer perimeter of the driven clutch sheaves.

The spacing of the sheaves in the primary drive clutch usually is controlled by centrifugal flyweights. As the drive clutch rotates faster (in response to increased engine rpm) the flyweights urge the movable sheave toward the stationary sheave. This pinches the drive belt, causing the belt to begin rotating with the drive clutch, the belt in turn causing the driven clutch to begin to rotate. Further movement of the drive clutch's movable sheave toward the stationary sheave forces the belt to climb outwardly on the drive clutch sheaves, increasing the effective diameter of the drive belt path around the drive clutch. Thus, the spacing of the sheaves in the drive clutch changes based on engine rpm. The clutch therefore can be said to be speed sensitive.

As the sheaves of the drive clutch pinch the drive belt and force the belt to climb outwardly on the drive clutch sheaves, the belt (not being stretchable) is pulled inwardly between the sheaves of the driven clutch, decreasing the effective diameter of the drive belt path around the driven clutch. This movement of the belt inwardly and outwardly on the drive and driven clutches smoothly changes the effective gear ratio of the transmission in infinitely variable increments. (CVT's hence are sometimes referred to as infinitely variable transmissions).

The spacing of the sheaves in the driven clutch usually is controlled by a different mechanism. Although a coil spring could be used to bias the sheaves of the driven clutch together, typically a more sophisticated torque-sensitive system is used to pinch the belt harder as more torque is conveyed by the drive belt to the driven clutch. A generally cylindrical cam with, e.g., three cam surfaces (often called ramps) on one end is secured to the output shaft of the driven clutch. Because the ramps are generally helical in shape, this cam is often referred to a helix. A set of a corresponding number of cam followers—typically buttons or rollers—is mounted to the movable sheave, and the movable sheave is mounted within the driven clutch so that it is free to move laterally and is also rotatable with respect to the shaft. The buttons or rollers are mounted in positions aligned with the ramps of the helix, and a torsion spring usually is used to urge the movable sheave rotationally to keep the buttons or rollers engaged against their respective helix ramps.

As torque is transmitted by the drive belt to the driven clutch sheaves, the belt tends to urge the moveable sheave laterally away from the stationary sheave, and also tends to rotate the movable sheave with respect to the shaft. Since the buttons are held against the ramps by the torsion spring, the torque being applied by the belt to the movable sheave tends to cause the buttons to slide up the ramps, which in turn tends to push the movable sheave toward the stationary sheave. Thus, the helix converts the torque of the drive belt to a force that pinches the sheaves together, providing good frictional contact of the sheaves against the drive belt. The more torque applied by the belt to the driven clutch, the harder the sheaves of the driven clutch pinch the belt, thereby preventing the belt from slipping and also tending to cause the transmission to downshift (i.e., urging the belt outwardly between the sheaves of the driven clutch, which causes the belt to move inwardly between the sheaves of the drive clutch). Thus, the spacing of the sheaves in the driven clutch changes based on torque. The clutch therefore can be said to be torque sensitive.

The actual position of the belt within the sheaves of the drive and driven clutches is determined by the balance of the forces acting on the moveable sheaves in the two clutches. In the drive clutch, these forces consist of the coil spring urging the sheaves apart and the speed-dependent force of the centrifugal flyweights which urges the sheaves together. In the driven clutch, these forces consist of the coil spring urging the sheaves together along with the torque-dependent force generated by the rollers on the helix ramps.

As mentioned above, the position of the drive belt between the clutch sheaves is determined by the balance of forces acting on the movable sheaves. In variable operating conditions this balance can be disrupted. For example, when the vehicle is traveling along at a given speed and then the rider momentarily lets off on the throttle, the balance of forces is disrupted, and can cause the system to momentarily shift out of the desired ratio. When the rider then again applies the throttle, torque is restored to the driven clutch, but the transmission is no longer in its optimal gear ratio, and takes a moment to adjust. Similarly, if the drive wheels momentarily leave the ground (such as when a professional rider goes off a jump) but the rider does not let off on the throttle, the load on the drive wheels is momentarily substantially reduced, again disrupting the balance of forces within the CVT and causing it to temporarily shift out of the desired gear ratio. When load is restored to the drive wheels, the CVT must again readjust to the proper gear ratio.

When the CVT must quickly downshift or upshift to return to the proper gear ratio, the belt must move outwardly or inwardly between the sheaves of the driven clutch, a movement that can be inhibited by the need of the moveable sheave to rotate with respect to the stationary sheave as the rollers travel along the helix ramp. This rotation of one sheave with respect to the other causes scrub on the sides of the drive belt, and, thus, frictional forces can prevent this shifting from happening as smoothly and quickly as would be desirable.

Due at least in part to this dynamic function of the CVT, the CVT does not provide significant engine braking through backdriving the engine. That is, in some types of vehicle drive trains when the vehicle is traveling along at a given speed and then the throttle is dropped (e.g., to an idle speed), the rotation of the drive wheels of the vehicle will backdrive the drive train, causing the engine to rotate at a speed greater than it otherwise would (based on throttle position). The inherent frictional forces present throughout the drive train, including particularly the compression forces present in the engine cylinders, tend to slow the vehicle down. This condition is commonly referred to as engine braking, and can be a useful feature. The degree of engine braking provided (in vehicles capable of doing so) is dependent on the gear ratio of the transmission-in higher gears less braking is provided, and in lower gears more braking is provided.

In a CVT, loss of balance of forces between the drive and driven clutches when the rider lets off on the throttle (including in particular the loss of the torque-induced pinching force by the helix on the belt) makes the CVT less effective in braking the engine. CVT systems also do not provide engine braking when the engine speed is reduced all the way to idle. That is, when the engine is simply idling, the drive clutch has its sheaves biased apart by a coil spring so that the sheaves do not effectively engage the drive belt. Usually the length of the drive belt is chosen so that it is a little bit loose in the idle position, preventing the shaft of the drive clutch from imparting any rotation to the drive belt and, thus, preventing the vehicle from "creeping". A consequence of the looseness of the drive belt, however, is that the driven clutch is not capable of backdriving the drive clutch (and, therefore, the engine) when the belt and clutches are in the idle position.

SUMMARY OF THE INVENTION

The invention provides a continuously variable transmission system for use on snowmobiles, ATV's and similar vehicles. The CVT facilitates engine braking, both in idle and above-idle conditions, and increases the responsiveness of the transmission during operation. The CVT includes a rotatable input shaft connectable to an engine of a vehicle, and a rotatable drive clutch connected to the input shaft, the drive clutch having at least one belt-engaging surface. A roller clutch (often referred to as an overrunning clutch) is disposed between the input shaft and the belt-engaging surface of the drive clutch. The CVT also includes a rotatable output shaft connectable to a drive axle of the vehicle. A rotatable driven clutch is connected to the output shaft. An endless flexible drive belt is disposed about the drive and driven clutches, the belt having at least one drive surface engageable with the belt-engaging surface of the drive clutch. The size of the drive belt and the configuration of the belt-engaging surface of the drive clutch are selected so that when the engine is at an idle speed the belt firmly engages the belt-engaging surface of the drive clutch. The roller clutch is positioned and configured so that it permits the belt-engaging surface of the drive clutch to remain substantially stationary when the input shaft is rotating, thereby permitting the belt and driven clutch to remain substantially stationary when the engine is at an idle speed; when the driven clutch attempts to drive the belt faster than the speed at which the drive clutch and input shaft are rotating, however, the roller clutch firmly engages the drive clutch's drive surface with the input shaft, thereby causing the driven clutch to backdrive the input shaft and engine to provide engine braking to the vehicle.

In a preferred embodiment, the drive clutch includes a laterally stationary sheave with an inner belt-engaging surface and a laterally movable sheave with an inner belt-engaging surface. A biasing mechanism is provided for normally biasing the movable sheave away from the stationary sheave and for selectively moving the movable sheave toward the stationary sheave in response to rotation of the drive clutch. The roller clutch includes an outer belt-engaging surface disposed radially inwardly of the belt-engaging surfaces of the stationary and movable sheaves. The driven clutch similarly has a laterally stationary sheave with an inner belt-engaging surface, a laterally movable sheave with an inner belt-engaging surface, and a mechanism for normally biasing the movable sheave toward the stationary sheave. The endless flexible drive belt includes an inner drive surface engageable with the outer surface of the roller clutch and a pair of side drive surfaces engageable against the inner belt-engaging surfaces of the sheaves. The size of the drive belt is selected so that when the engine is at an idle speed the inner surface of the belt firmly engages the outer surface of the roller clutch. The roller clutch permits its belt-engaging surface to remain substantially stationary when the input shaft is rotating, thereby permitting the belt and driven clutch to remain substantially stationary when the engine is at an idle speed. Thus, the vehicle does not experience any "creep" when idling, yet the drive belt is firmly engaged with the roller clutch so that the CVT is capable of backdriving the engine from this position.

Preferably the stationary sheave of the driven clutch is mounted to a roller clutch, which in turn is mounted to the output shaft, the roller clutch providing positive rotational engagement of the stationary sheave against the output shaft when the stationary sheave is rotated in the direction of driving rotation of the drive clutch. The roller clutch is configured and arranged to permit the stationary sheave to rotate in the opposite direction of the output shaft. The movable sheave includes one or more cam followers and is rotatable with respect to the output shaft and the stationary sheave. A generally cylindrical cam (i.e., a helix) is secured to the output shaft, the cam having one or more inclined ramps for engagement with the cam followers. Preferably the cam includes two or more sets of inclined ramps against which the cam followers ride, each set including generally oppositely oriented acceleration and deceleration ramps configured generally in the shape of a "V." In a particularly preferred embodiment the deceleration ramp has a generally convex curved profile. The ramps function to urge the cam followers (and, therefore, the movable sheave) toward the stationary sheave in response to torque acting between the movable sheave and the cam. The roller clutch permits both sheaves to move together in unison (without belt scrub) between a first position where the cam followers engage the acceleration ramp and a second position where the cam followers engage the deceleration ramp.

DETAILED DESCRIPTION OF THE INVENTION

Figure 1:
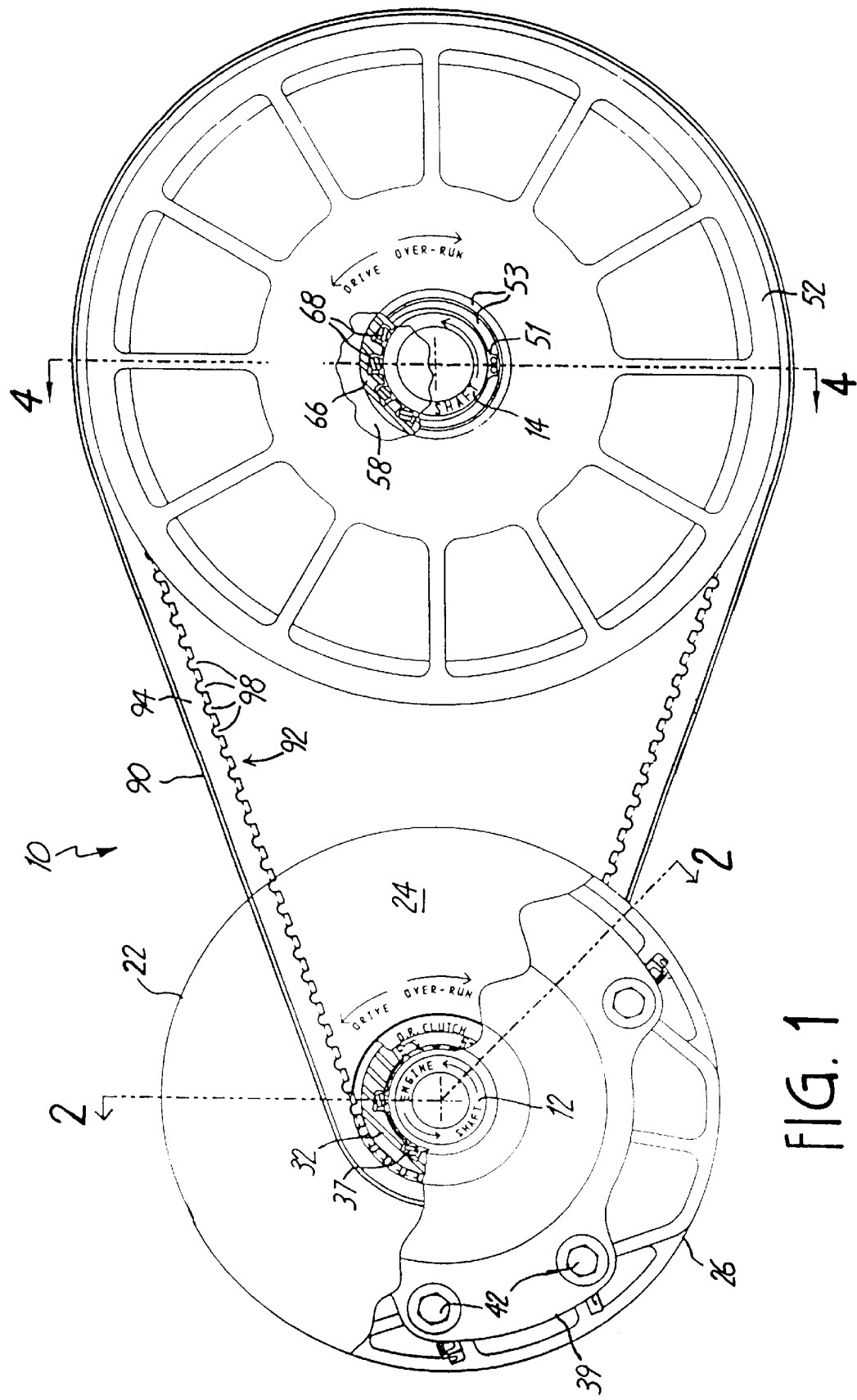
FIG. 1 is a side, partially broken-away view of a continuously variable transmission system of the invention.

FIG. 1 depicts one embodiment of a continuously variable transmission (CVT) system 10 employing the improvements of the invention. While the details of the invention are described with reference to this particular type of CVT, it will be understood that variations in the structure and components of the basic CVT system may be made while still employing the substance of the invention. The preferred system shown in the drawings includes a rotatable split sheave primary drive clutch 20 mounted to a rotatable input shaft 12 (which typically is connected directly to the vehicle's engine). A rotatable split sheave secondary driven clutch 50 is mounted to a rotatable output shaft 14 (which typically is connected to additional drive train components, as described above, and ultimately to the drive axle and wheels of the vehicle). An endless, generally V-shaped flexible drive belt 90 is disposed around the two clutches. The CVT system shown in FIG. 1 is in the idle position. That is, the drive belt 90 is positioned near the periphery of the driven clutch 50 and near the center of the drive clutch 20.

FIG. 1 shows that the drive and driven clutches 20 and 50 each include a roller clutch 32 and 66 respectively (often referred to as an over-running clutch), the function and operation of which is described in detail below.

Figure 2:
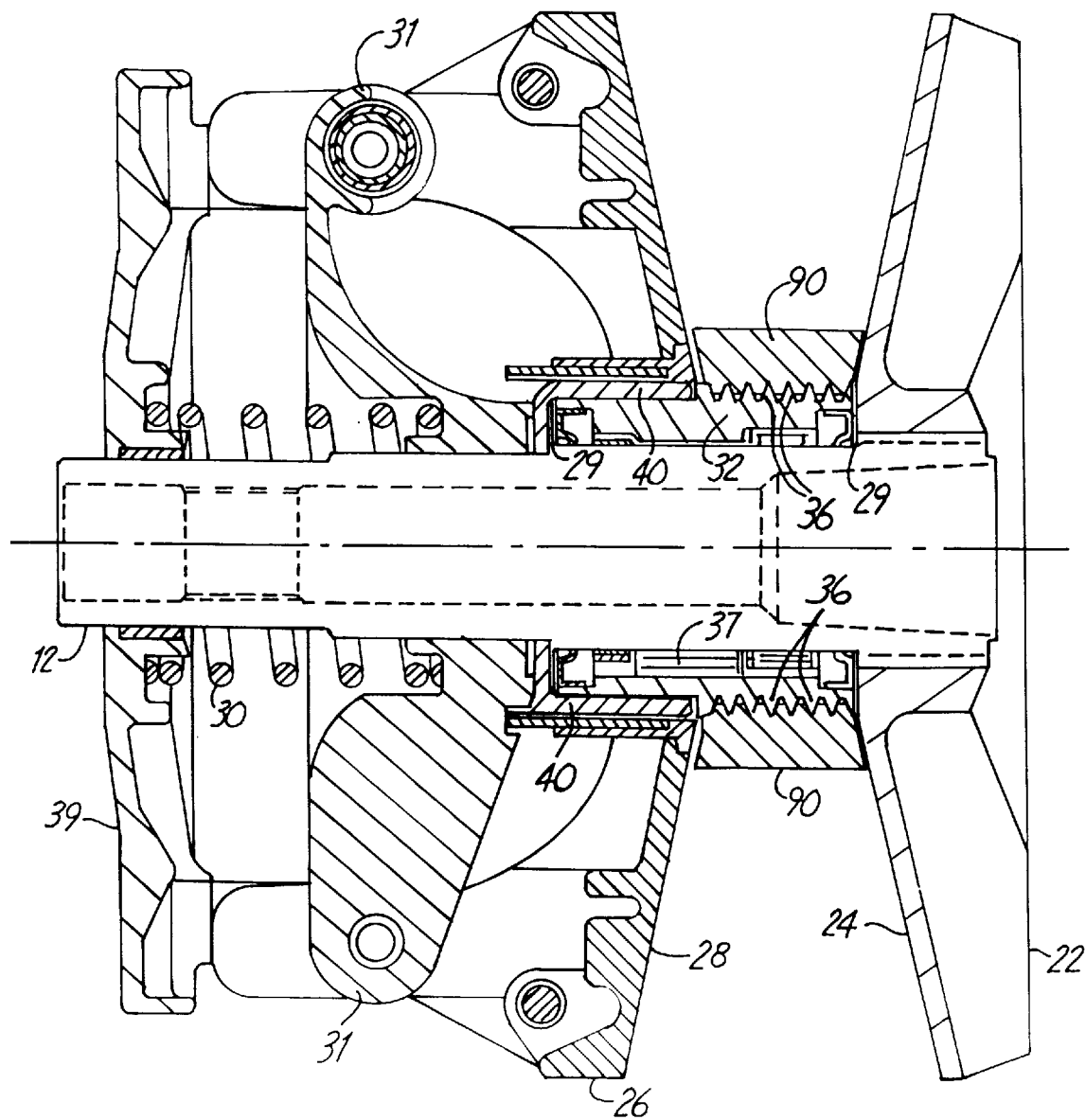
FIG. 2 is a cross-sectional view of the primary drive clutch shown in FIG. 1, taken along lines 2—2 thereof.

The drive clutch 20, which is shown in cross-section in FIG. 2, is similar in configuration to conventional split sheave primary drive clutches. The drive clutch 20 includes a laterally stationary sheave 22 having an inner belt-engaging surface 24, a laterally movable sheave 26 having a complementary inner belt-engaging surface 28, and a coil spring 30 for normally biasing the movable sheave 26 away from the stationary sheave 22. The belt-engaging surfaces of the sheaves 22 and 26 are tapered so that together they form generally the shape of a V-the angle of the V generally matching the V-shaped angle of the drive belt 90.

The drive clutch 20 includes a set of three conventional centrifugal weights 38 which urge the movable sheave 26 toward the stationary sheave 22 in response to rotation of the drive clutch 20. Thus, the drive belt 90 rides near the center of the clutch 20 when the engine (and, hence, the drive clutch) is rotating at slow speeds. At higher speeds the centrifugal weights 38 urge the movable sheave 26 toward the stationary sheave 22, thereby pinching the belt and causing it to move outwardly between the sheaves.

In conventional CVT systems some provision must be made so that at idle speeds that the vehicle does not "creep" (i.e., even though the engine is rotating, this rotation is not transmitted to the driven clutch). One way of accomplishing this is to make the drive belt sufficiently loose so that at idle speeds rotation of the drive clutch is not transmitted to the driven clutch by the belt. This looseness in the belt (or other provision for effectively disengaging the engine from the driven clutch at idle), however, not only prevents the driven clutch from rotating when the engine is idling, but also prevents the driven clutch from backdriving the engine, and thus prevents engine braking from the CVT idle position. In contrast to these prior art clutches, the CVT system of the invention utilizes a one-way roller clutch 32 in the drive clutch 20 to prevent the belt 90 from driving the driven clutch 50 when the engine is idling, while permitting the driven clutch 50 to backdrive the drive clutch 20 and the engine. Roller clutches, often referred to as over-running clutches, permit an outer sleeve to rotate in one direction with respect to an inner shaft (or vice versa), but prevent rotation of the outer sleeve with respect to the inner shaft in the opposite direction. The preferred roller clutch 32 utilized in the drive clutch 20 includes an outer drive surface (in this case a belt-engaging surface 34) disposed radially inwardly of the belt-engaging surfaces of the stationary and movable sheaves 22 and 26, and a set of internal rolls 37 disposed in suitable roller clutch cavities. (While roller clutches of this type are generally well known in the art, further details regarding a roller clutch successfully used by applicants may be found in U.S. Pat. application Ser. No. 08/438,811, the contents of which are incorporated herein by reference.) The inner drive surface 92 of the drive belt 90 rides against the outer belt-engaging surface 34 of the roller clutch 32. The roller clutch 32 is oriented with respect to the engine drive shaft 12 so that the roller clutch's inner rollers permit its outer drive surface (belt-engaging surface 34) to remain stationary while the engine drive shaft 12 (along with the inner portion of the roller clutch 32) rotates in its intended direction of rotation. If the driven clutch 26 backdrives the drive belt 90 when the drive belt 90 is engaged against the belt-engaging surface of the roller clutch 32, however, the drive belt 90 then backdrives the roller clutch 32, which then positively engages the input shaft 12 to backdrive the engine. Thus, the roller clutch 32 facilitates engine braking when the CVT is in its idle position.

To promote good frictional contact between the inner drive surface 92 of the drive belt 90 and the outer belt-engaging surface 34 of the roller clutch 32, desirably each of these surfaces is provided with complementary, generally V-shaped longitudinal grooves. The V-shaped grooves 96 of the drive belt 90 provide greater surface area contact with the complementary V-shaped grooves 36 of the roller clutch 32. To assure proper nesting of the grooves (and, therefore, good frictional contact), preferably the apex of the V in both the belt and the roller clutch is somewhat flattened-this provides some relief in the tolerances of the two parts, and reduces the likelihood that any of the apexes of the V's will bottom-out in their corresponding grooves, (which would thereby precluding a close fit between the side surfaces of the nested V-shaped grooves). It may also be desirable to use a slightly wider drive belt 90 than is conventionally used in CVT transmissions, thereby increasing the number of grooves and the overall frictional contact between the belt and the roller clutch. Preferably the belt also includes regularly spaced transverse notches 98 (see FIG. 12) in its inner drive surface 92 (such notches could also be on the outer surface), thereby permitting the belt to be constructed sufficiently strong (to withstand the forces applied to it by the drive and driven clutches), and yet be flexible enough to bend around the relatively small outer diameter of the drive clutch's central roller clutch 32.

Figure 3:
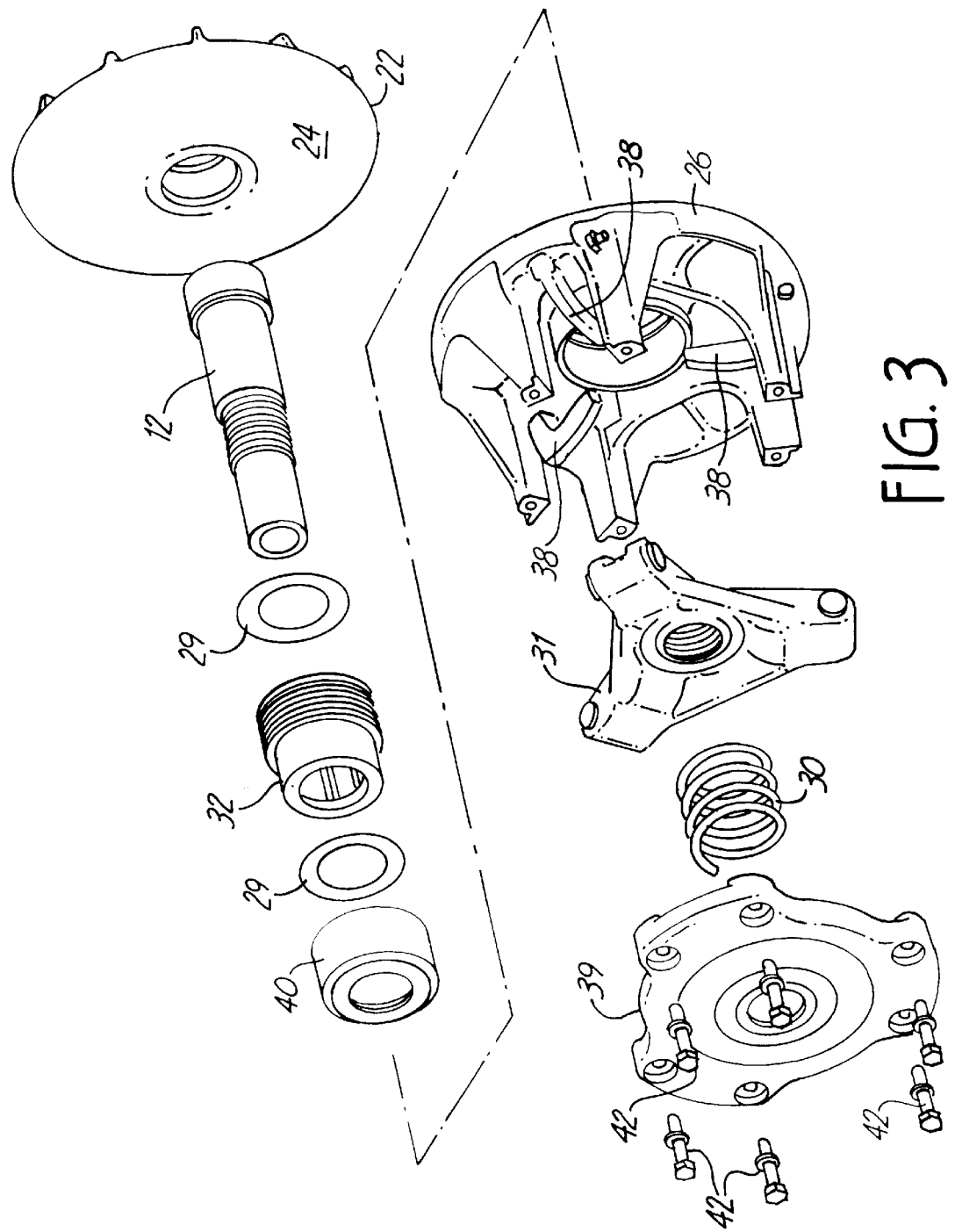
FIG. 3 is an exploded, perspective view of the primary drive clutch of FIGS. 1 and 2.

FIG. 3 illustrates the drive clutch 20 in exploded fashion. The roller clutch 32 is received over the input shaft 12, being disposed between a pair of thrust washers 29. A generally cylindrical spacer 40 is provided between a portion of the outer surface of the roller clutch 32 and the inner surface of the movable sheave 26. The conventional spider 31 is secured directly to the shaft 12 by complementary threads, and is captured between the movable sheave 26 and the cover 39, which is secured by suitable bolts 42 to the movable sheave. The coil spring 30 urges the cover and, therefore, the movable sheave 26 away from the stationary sheave 22, the radially extending ends of the spider 31 providing bearing surfaces against which the flyweights 38 act to urge the movable sheave 26 toward the stationary sheave 22 at rotational speeds above engine idle.

Figure 4:
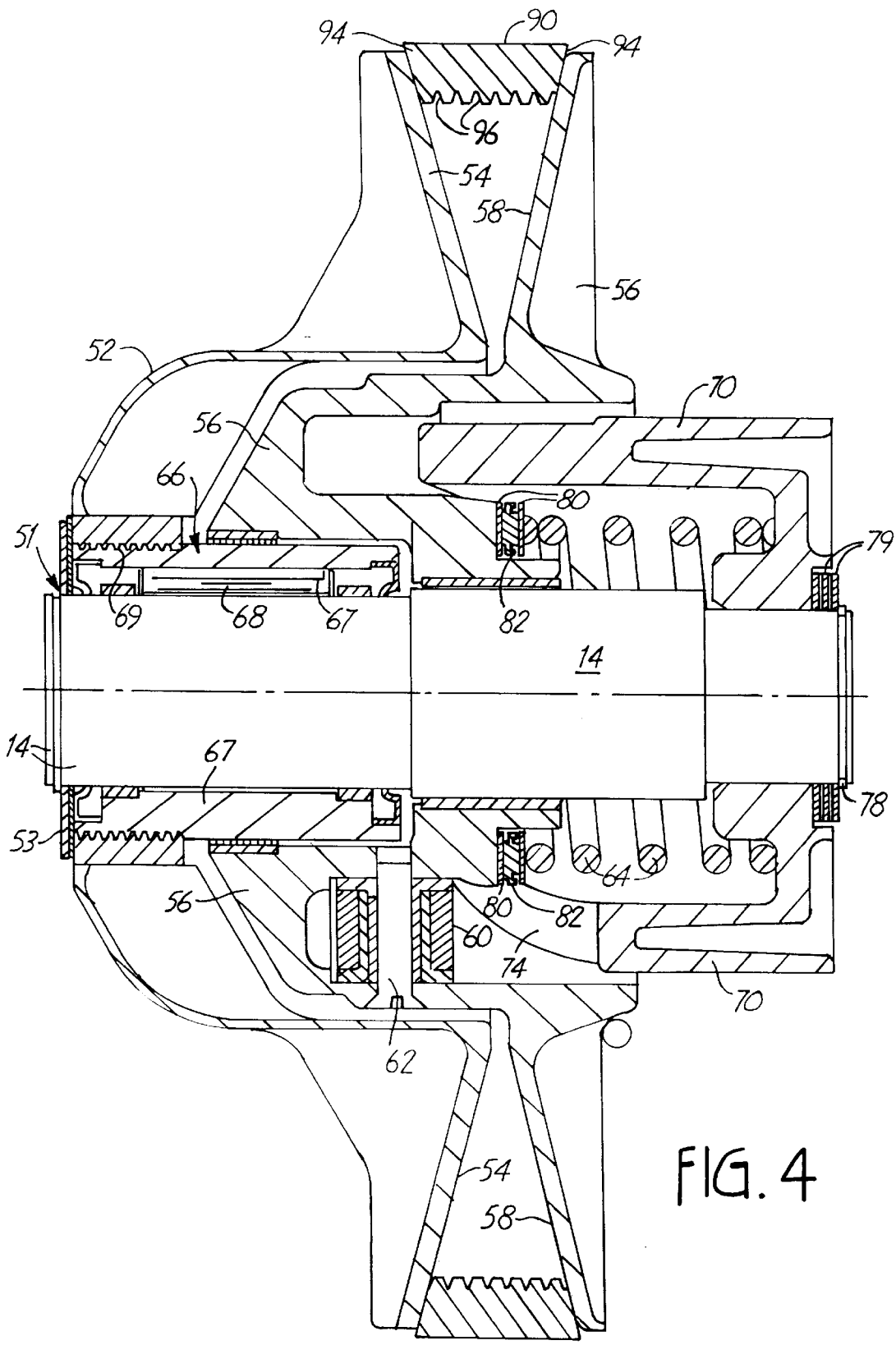
FIG. 4 is a cross-sectional view of the secondary driven clutch shown in FIG. 1, taken along lines 4—4 thereof.
Figure 5:
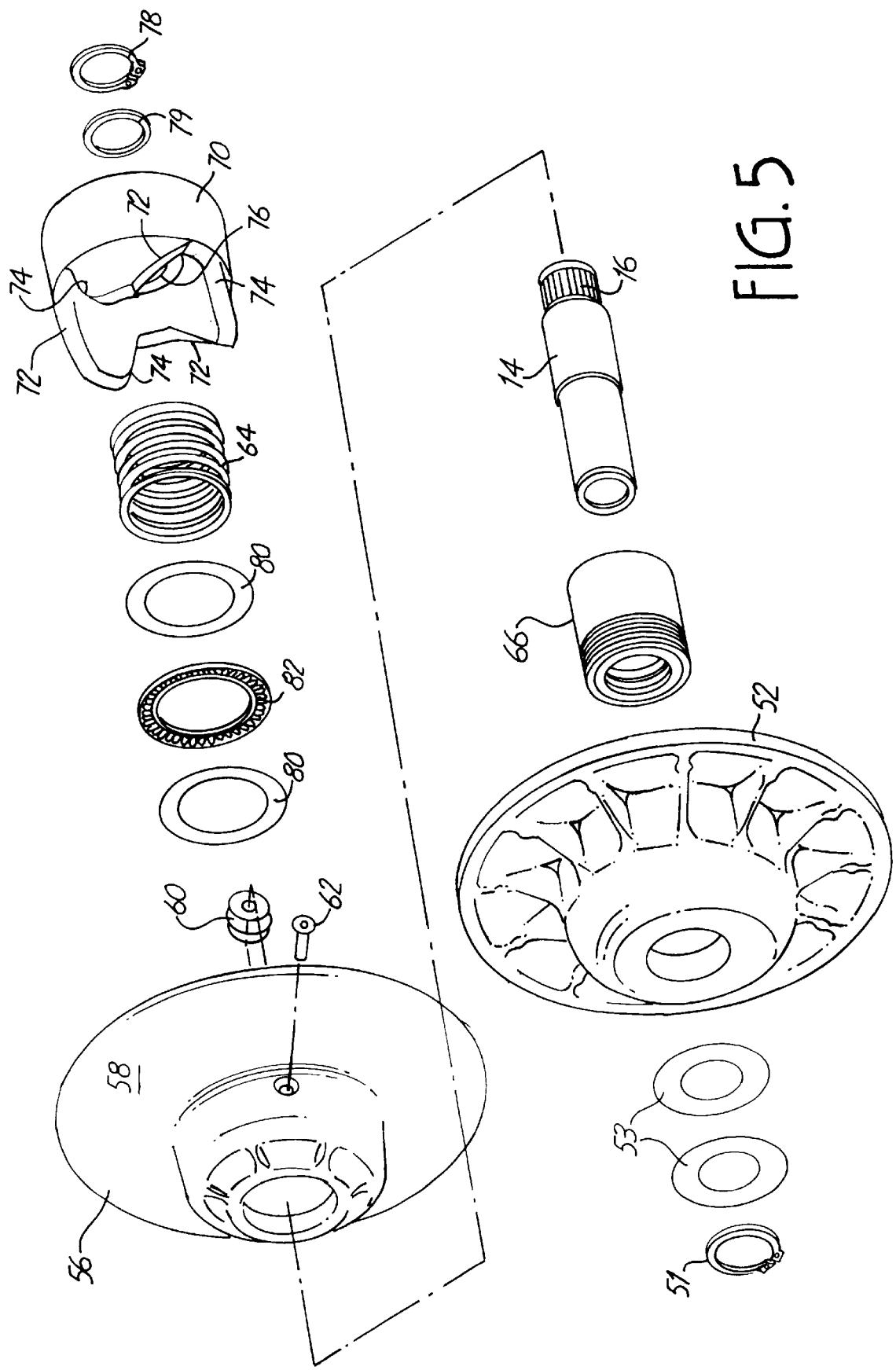
FIG. 5 is an exploded, perspective view of the secondary driven clutch of FIGS. 1 and 4.

FIGS. 4–5 illustrate details of the structure of the driven clutch 50. As with the drive clutch 20, the driven clutch 50 is generally similar to conventional split sheave driven clutches. It includes a laterally stationary sheave 52 having an inner belt-engaging surface 54, the sheave 52 being retained on the output shaft 14 by a snap ring 51 and washers 53 (or other suitable mechanism). A laterally movable sheave 56 is also carried about the output shaft 14, the movable sheave having an inner belt-engaging surface 56 that together with the belt-engaging surface 54 of the stationary sheave 52 defines a generally V-shaped space in which the drive belt 90 is disposed.

The driven clutch 50 also includes a generally cylindrical cam or helix 70 having several sets (preferably three) of inclined ramps 72 and 74. The helix 70 is retained on the output shaft 14 by a snap ring 78 (or other suitable fastener) and one or more optional shim washers 79, and is rotationally secured to the output shaft 14 by internal splines 76 which engage complementary splines 16 on output shaft 14. A coil spring 64 is disposed between the helix 70 and the movable sheave 56 to normally urge the movable sheave 56 toward the stationary sheave 52 (other suitable means may also be employed for this function, but use of a coil spring works well). FIG. 5 shows the use of a pair of washers 80 on opposite sides of a thrust bearing 82, all three components being disposed between the coil spring 64 and the movable sheave 56; alternately, only a single washer 80 (with no thrust bearing 82) may be employed.

The movable sheave 56 carries a set of cam followers 60. Preferably the cam followers are rollers 60 secured by countersunk bolts 62, though suitable low friction buttons or other suitable structures may also be employed. The cam followers engage the ramps 72 and 74 of the helix 70. The ramps 72 and 74 function to urge the cam followers 60 and, therefore, the movable sheave 56 toward the stationary sheave 52 in response to torque applied by the belt 90 to the movable sheave 56. That is, as the belt 90 is driven by the drive clutch 20, the belt acts to rotate the sheaves of the driven clutch 50. The movable sheave 56 is not directly rotationally secured to the output shaft 14, and thus will rotate with respect to the output shaft 14 and the helix 70 until the rollers 60 engage their respective ramps of the helix 70. Further torque exerted by the belt 90 on the movable sheave 56 tends to urge the rollers 60 up the ramps, thereby pushing the movable sheave 56 toward the stationary sheave 52 to pinch the belt 90 ever tighter. Thus, the more torque applied to the movable sheave 56 by the belt 90, the harder the sheaves pinch the belt, assuring good frictional contact between the belt 90 and the sheaves. This action also causes the belt 90 to move radially outwardly between the sheaves, thereby tending to downshift the CVT. As torque is lowered, the pinching force of the helix is also lowered, giving way to belt tension applied by the drive clutch and causing the CVT to upshift. Ordinarily the stationary sheave of a driven clutch is secured rotationally directly to the output shaft. As is described in further detail below, Applicants have discovered certain advantages to interposing a one-way clutch between the stationary sheave 52 and the output shaft 14. Preferably the one-way clutch consists of a roller clutch 66, but it could also be a wrap spring, a ratchet, or any other suitable one-way mechanism.

The roller clutch 66 includes an outer sleeve 67 having threads 69 (or other suitable attachment mechanism) for securing the stationary sheave 52 to the roller clutch sleeve 67, and a set of internal rolls 68 disposed in suitable roller clutch cavities. (While roller clutches of this type are generally well known in the art, further details regarding a roller clutch successfully used by applicants may be found in U.S. patent application Ser. No. 08/438,811, the contents of which are incorporated herein by reference.) The roller clutch 66 positively engages the stationary sheave 52 with the output shaft 14 when the belt 90 drives the stationary sheave 52 in the normal direction of rotation. For reasons explained below, however, the roller clutch 66 permits the stationary sheave to freely rotate with respect to the output shaft 14 in the opposite direction.

Figure 6A:
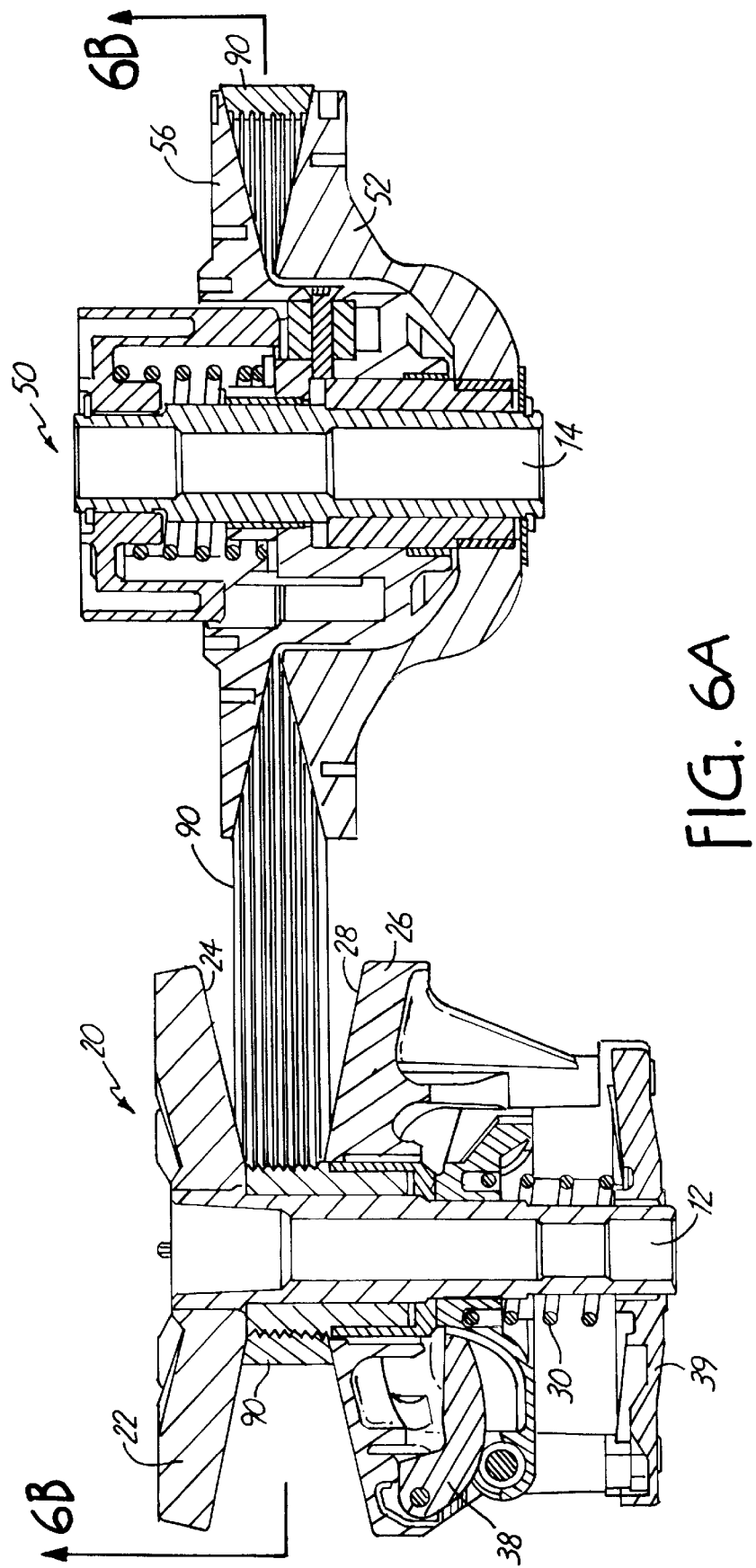
FIG. 6A is a cross-sectional view of a continuously variable transmission system of the invention in an idle (or low speed) position.
Figure 6B:
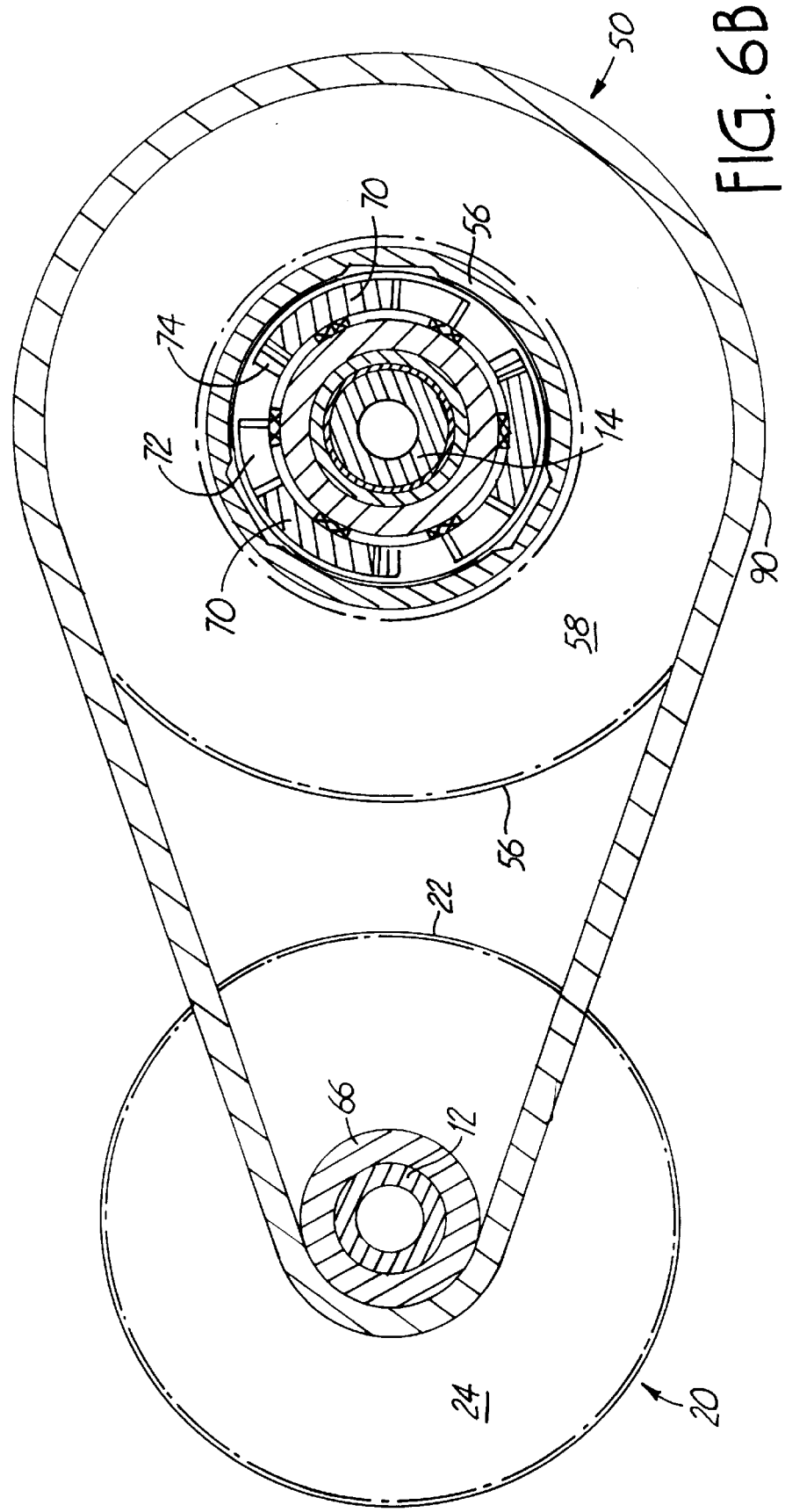
FIG. 6B is a cross-sectional view of FIG. 6A, taken along lines 6B—6B thereof.

FIGS. 6A–6B, 7A–7B and 8A–8B illustrate three different positions, corresponding to three different speeds of the CVT system of the invention. FIGS. 6A–6B show the system in the engine-idling position (which is the same as the system position when the engine is not running). The coil springs 30 and 64 of the drive and driven clutches urge the sheaves of the drive clutch 20 apart and the sheaves of the driven clutch 50 together. The drive belt 90 thus is pinched outwardly to the periphery of the driven clutch 50, and thereby pulled tightly against the drive clutch's roller clutch 32 (which is carried on the input shaft 12). The sides 94 of the belt 90 are not frictionally engaged against the sheaves of the drive clutch 20. When the engine is started and the input shaft 12 begins to rotate, the roller clutch 32 permits the drive clutch 20 to rotate without imparting any rotation to the drive belt 90 or the driven clutch 50.

Should the vehicle be rolling forwardly with the CVT in this idle position, the CVT will backdrive the engine, thereby providing engine braking. The backdriving occurs as follows. Assume that (as is illustrated in FIG. 1, which also depicts the CVT in the idle position), the input shaft 12 normally rotates in the counterclockwise direction. The forward rolling motion of the vehicle causes the wheels, axles, and associated drive train components to backdrive the CVT output shaft 14 in the counterclockwise direction. The helix 70 will thus rotate counterclockwise along with the output shaft 14 until its deceleration ramps 74 encounter the rollers 60 carried by the movable sheave 56 (which is not otherwise rotationally secured to the shaft 14). The roller clutch 66 permits the stationary sheave 52 to remain stationary with respect to the shaft 14, so no movement of the sheaves or the drive belt occurs until the helix 70 encounters the rollers 60. When this occurs, however, the helix 70 begins to drive the movable sheave 56 counterclockwise, and the force of the helix deceleration ramps 74 against the rollers 60 urges the rollers and, therefore, the movable sheave 56 toward the stationary sheave 52, pinching the belt 90 more tightly and urging it radially outwardly. This tightens the belt 90 against the roller clutch 32 of the drive clutch 20. The rotation of the driven clutch 50 is thus imparted to the belt 90 and to the roller clutch 32 carried on the input shaft 12 of the drive clutch 20. The counterclockwise rotation of the driven clutch and belt thus rotates the roller clutch 32 counterclockwise (the same direction that the engine is rotating the input shaft 12). If the speed of rotation of the roller clutch 32 caused by the drive train backdriving the CVT exceeds the speed of rotation of the shaft 12 caused by the engine, the rolls 37 in the roller clutch will lock up onto the shaft 12, causing the shaft 12 and engine to rotate faster than they otherwise would. The compression of the engine cylinders (and other frictional forces in the engine) thus will tend to slow the rotation of the entire drive train (including the CVT) of the vehicle, providing engine braking.

Figure 7A:
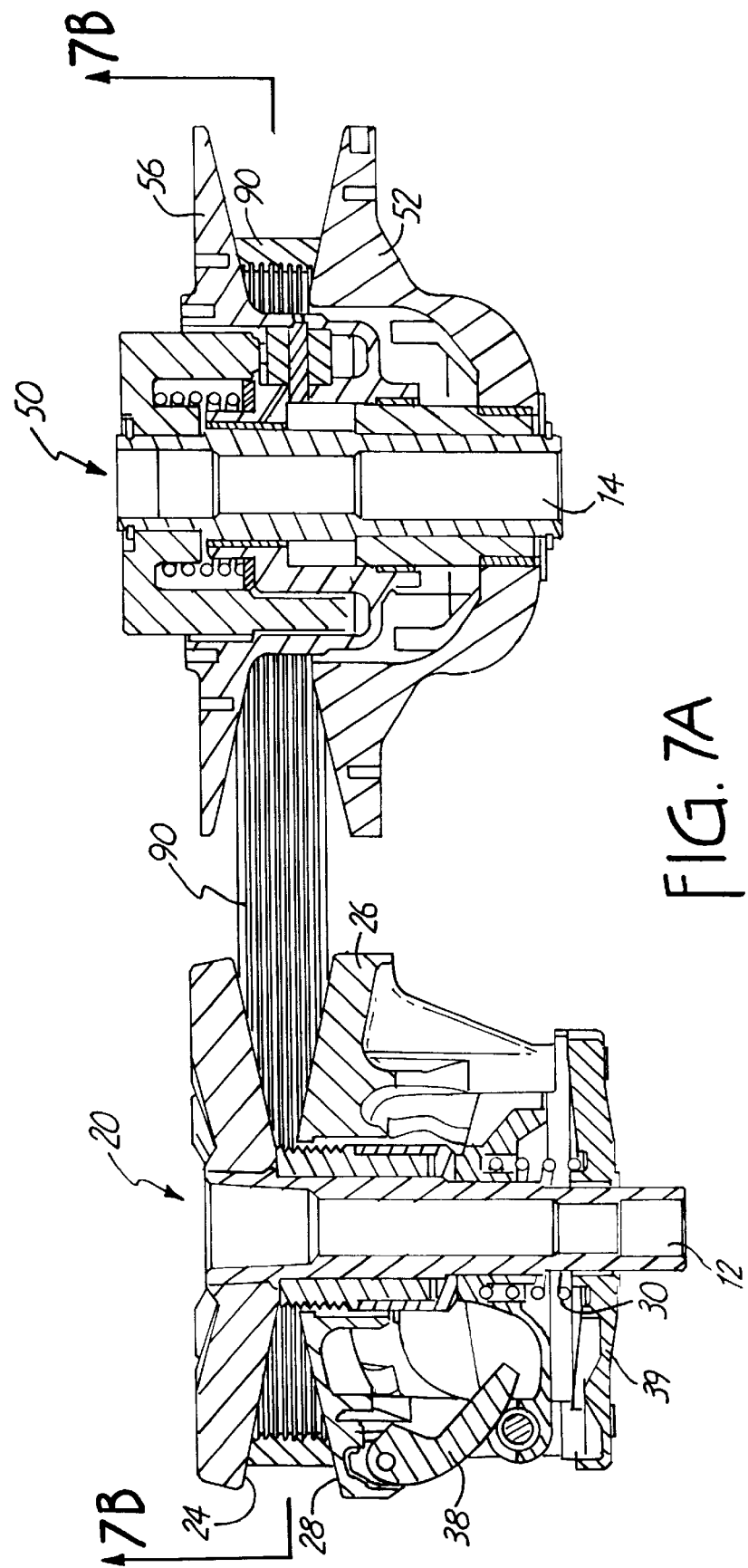
FIG. 7 is a cross-sectional view of a continuously variable transmission system of the invention in an intermediate speed ratio position.
FIG. 7B is a cross-sectional view of FIG. 7A, taken along lines 7B—7B thereof.

FIGS. 7A–7B illustrate the CVT in an intermediate speed position. In this position the rotation of the drive clutch 20 has caused the centrifugal flyweights 38 to urge the movable sheave 26 toward the stationary sheave 22, thus pinching the belt 90 and urging it radially outwardly. This motion correspondingly pulls the belt 90 radially inwardly between the sheaves of the driven clutch 50. The exact position of the belt 90 with respect to the sheaves of the drive and driven clutches is a balance between the speed sensitive drive clutch 20 and the torque sensitive driven clutch.

Figure 8A:
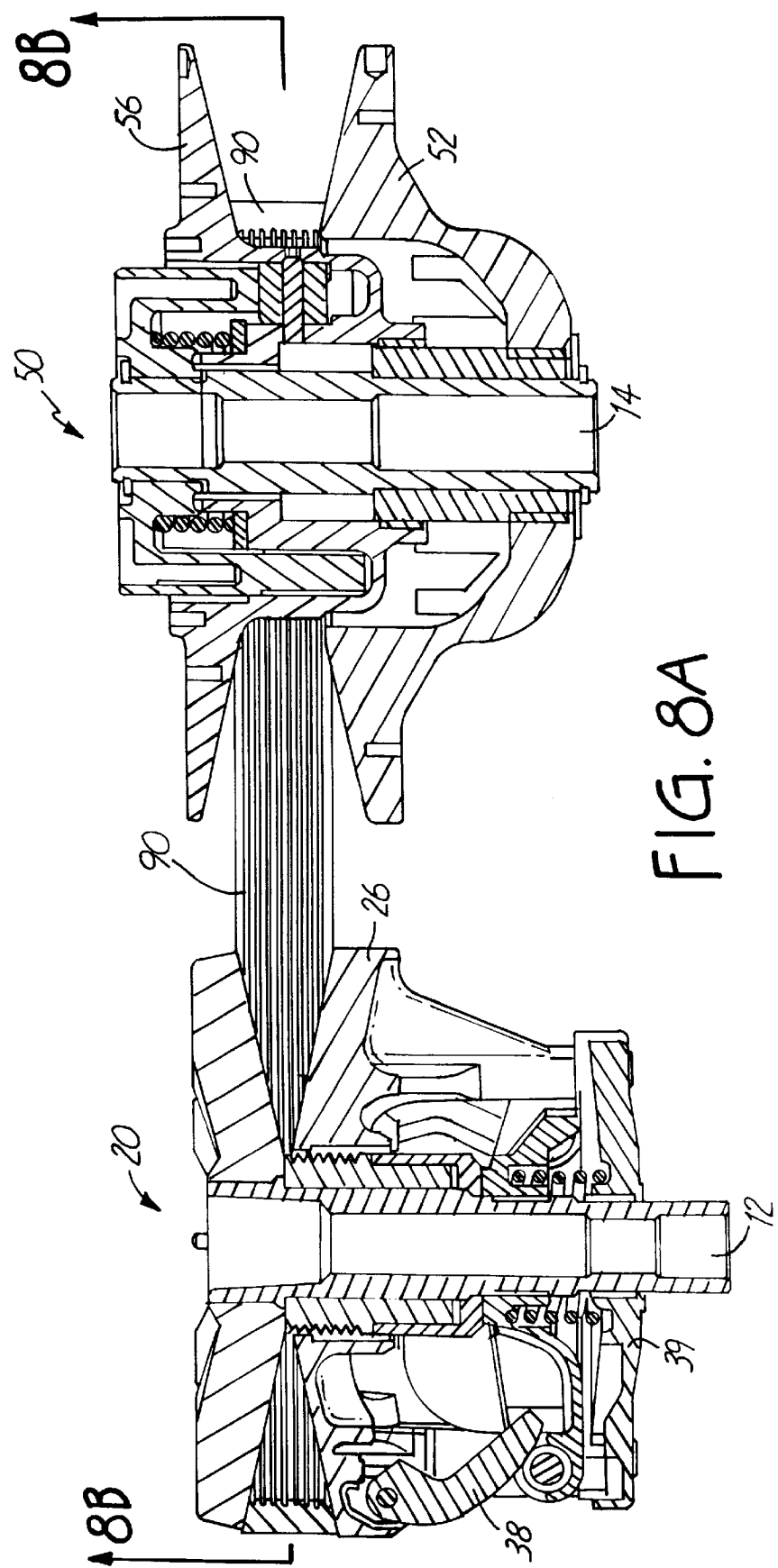
FIG. 8 is a cross-sectional view of a continuously variable transmission system of the invention in a high speed ratio position.
FIG. 8B is a cross-sectional view of FIG. 8A, taken along lines 8B—8B thereof.
Figure 8B:
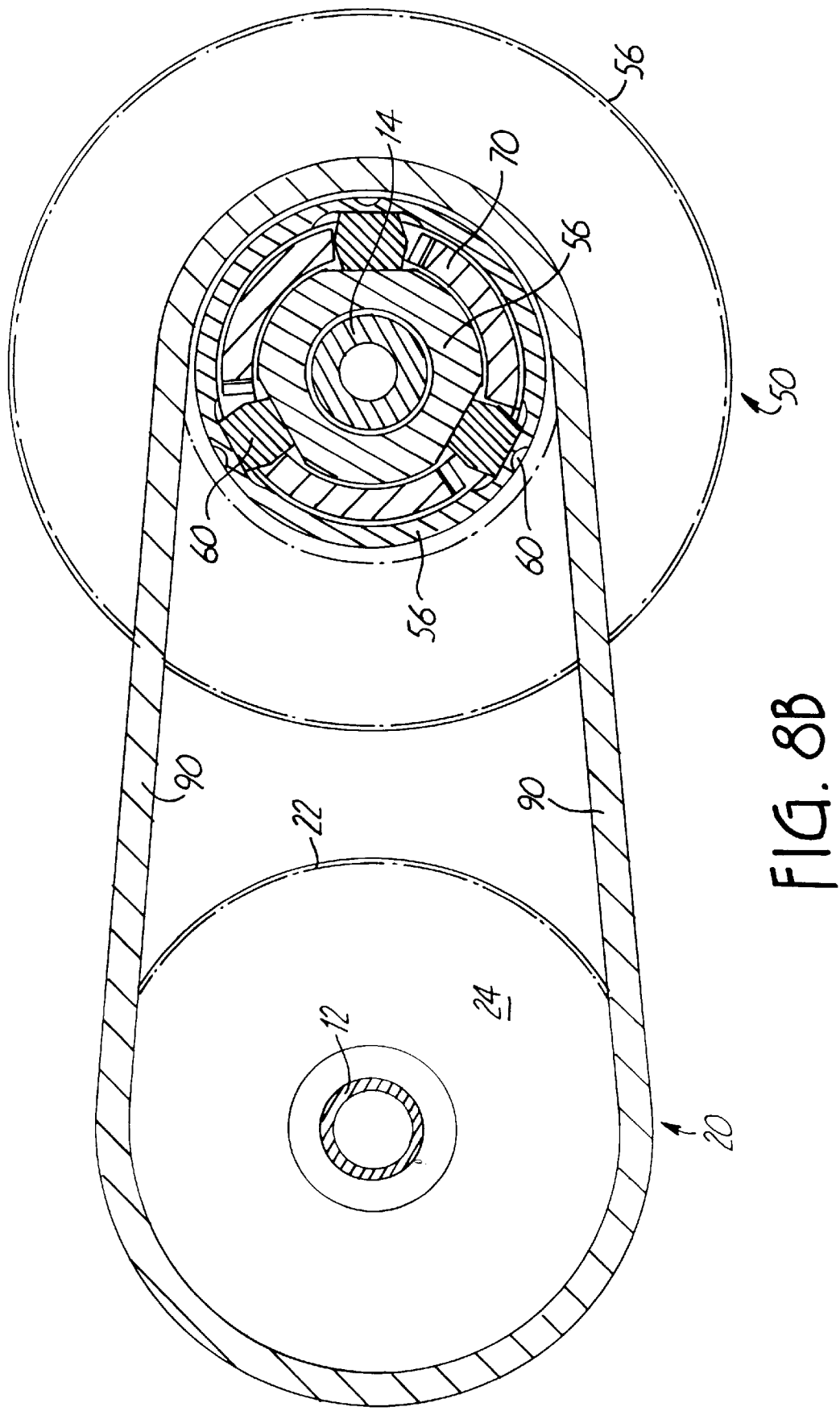

If the driver is driving the vehicle at, e.g., an intermediate speed such, as is shown in FIGS. 7A–7B, (or a high speed, as is shown in FIG. 8A–8B) and then lets off on the throttle, e.g., to idle, the rotation of the engine (and, therefore, the CVT components) would ordinarily drop more quickly than the speed of the vehicle. The vehicle wheels and associated drive train thus will backdrive the output shaft 14 of the CVT. The torque applied by the belt to the torque-sensitive driven clutch 50 drops with the decrease in engine speed, decreasing the pinching force on the belt and thus normally causing a prior art CVT to lose its balance of forces, making it unable to back-drive the engine. The roller clutch 66 in the driven clutch 50 of the invention, however, permits the driven clutch sheaves to rotate together with the belt (with no scrubbing against the side drive surfaces 94 of the belt) relative to the output shaft 14 and the helix 70 until the rollers 60 carried by the movable sheave encounter the deceleration ramps 74 of the helix-a movement that actually happens quite rapidly. At this point the torque of the helix's deceleration ramps 74 (being driven by the vehicle wheels and drive train) urge the rollers 60 and the movable sheave 56 toward the stationary sheave 52, pinching the belt 90 to provide good frictional contact and downshifting the CVT. The backdriving of the vehicle drive train is thus transmitted to the drive clutch and to the engine, providing engine braking to the vehicle.

Figure 10:
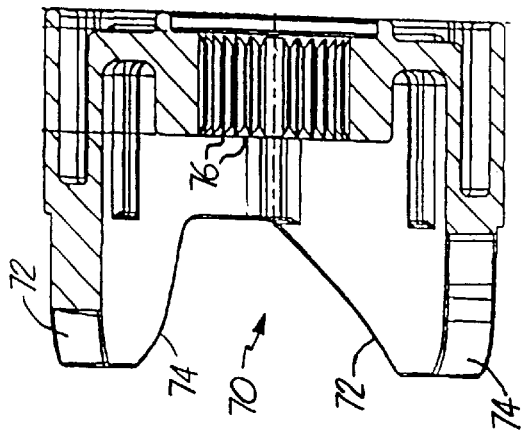
FIG. 10 is a cross-sectional view of FIG. 9, taken along lines 10—10 thereof.
Figure 11:
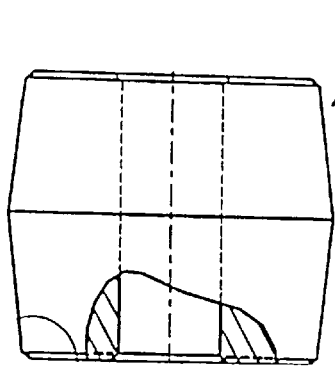
FIG. 11 is a side view of a preferred roller usable in the secondary driven clutch of the invention.
Figure 9:
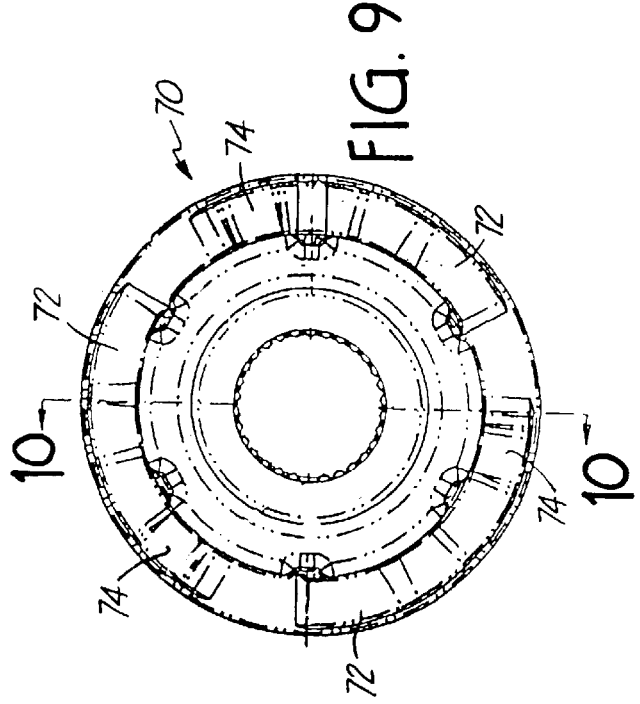
FIG. 9 is an end view of a preferred cylindrical cam (helix) usable in the secondary driven clutch of the invention.
Figure 12:
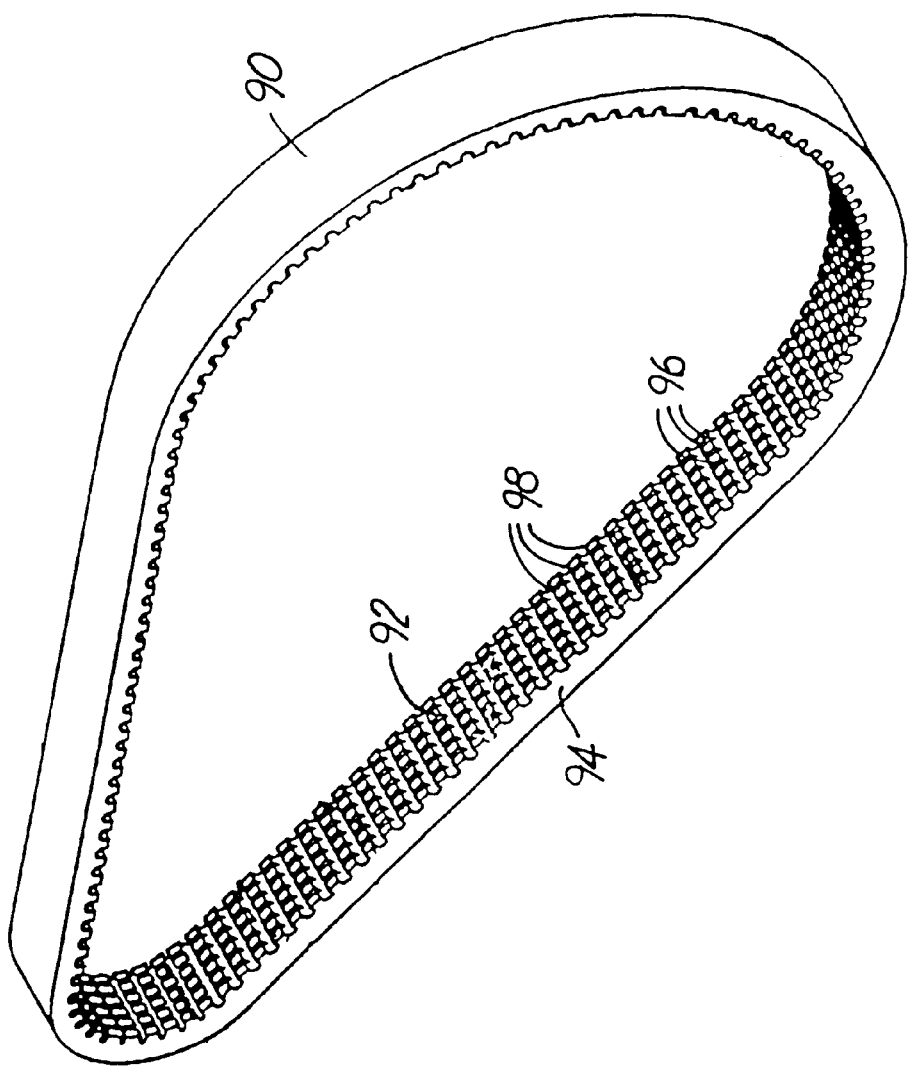
FIG. 12 is a perspective view of a preferred drive belt usable in the system of the invention.

FIGS. 9–10 depict further details regarding the shape of a preferred helix 70. Preferably the cam-follower engaging surfaces 72 and 74 of the helix 70 are shaped so that they are parallel to the axis of the rollers 60 (if not parallel to this axis, they would tend to cause uneven wear of the rollers 60). Also, FIG. 11 depicts details regarding the shape of a preferred roller 60, including the fact that its side walls are generally convex so that its contact with the surfaces 72 and 74 of the helix is generally centered. In the configuration shown in the drawing the side walls of the roller are tapered slightly to a central point which contacts the surfaces of the acceleration and deceleration ramps. This configuration also has been found to provide a low-wear, low friction interface between the respective components. Other convex shapes could also be utilized. Applicants have found that rollers made from Vespel™ available from duPont, works particularly well, as does a mixture of Vespel™ and nitrile rubber. FIG. 12 depicts details regarding a preferred drive belt 90, which includes both V-shaped longitudinal grooves 96 and transverse notches 98. The size and spacing of these grooves and notches is selected based on the degree of frictional contact required between the various clutch components and the desired flexibility of the belt.

While a preferred embodiment of the present invention has been described, it should be understood that various changes, adaptations and modifications may be made therein without departing from the spirit of the invention and the scope of the appended claims.

What is claimed is:

1. A continuously variable transmission system comprising:

a rotatable input shaft connectable to an engine of a vehicle;

a rotatable drive clutch connected to the input shaft, the drive clutch having a laterally stationary sheave with an inner belt-engaging surface, a laterally movable sheave with an inner belt-engaging surface, biasing means for normally biasing the movable sheave away from the stationary sheave and for selectively moving the movable sheave toward the stationary sheave in response to rotation of the drive clutch, and a roller clutch carried on the input shaft, the roller clutch having an outer belt-engaging surface disposed radially inwardly of the belt-engaging surfaces of the stationary and movable sheaves;

a rotatable output shaft connectable to a drive axle of the vehicle;

a rotatable driven clutch connected to the output shaft, the driven clutch having a laterally stationary sheave with an inner belt-engaging surface, a laterally movable sheave with an inner belt-engaging surface, and means for normally biasing the movable sheave toward the stationary sheave; and an endless flexible drive belt disposed about the drive and driven clutches, the belt having an inner drive surface engageable with the outer surface of the roller clutch and a pair of side drive surfaces engageable against the inner belt-engaging surfaces of the sheaves, the size of the drive belt being selected so that when the engine is at an idle speed the inner surface of the belt firmly engages the outer surface of the roller clutch;

the roller clutch being configured and arranged to permit the belt-engaging surface of the roller clutch to remain substantially stationary when the input shaft is rotating, thereby permitting the belt and driven clutch to remain substantially stationary when the engine is at an idle speed.

2. The transmission system of claim 1 wherein the roller clutch firmly engages the input shaft when the inner drive surface of the drive belt is engaged with the belt-engaging surface of the roller clutch and the driven clutch attempts to drive the belt faster than the speed at which the drive clutch and input shaft are rotating, thereby permitting the driven clutch to backdrive the input shaft and engine to provide engine braking to the vehicle.

3. The transmission system of claim 1 wherein the width of the drive belt is selected so that the belt does not come into substantial driving contact with the inner surfaces of the drive clutch sheaves when the drive clutch is rotating at an idle speed.

4. The transmission system of claim 3 wherein the biasing means of the drive clutch and the lateral spacing of the sheaves is selected so that rotation of the drive clutch at speeds above engine idle will cause the biasing means to compress the sheaves against the side drive surfaces of the drive belt.

5. The transmission system of claim 1 wherein the inner drive surface of the drive belt includes a plurality of generally V-shaped longitudinal grooves and the outer belt-engaging surface the roller clutch includes a plurality of complementary generally V-shaped grooves.

6. The transmission system of claim 1 wherein the driven clutch comprises:

a laterally stationary sheave with an inner belt-engaging surface, the stationary sheave being mounted to a one-way clutch which in turn is mounted to the input shaft, the one-way clutch providing positive rotational engagement of the stationary sheave against the output shaft when the stationary sheave is rotated in the direction of driving rotation of the drive clutch and the input shaft, the one-way clutch permitting the stationary sheave to rotate in the opposite direction with respect to the output shaft;

a laterally movable sheave with an inner belt-engaging surface, the movable sheave having one or more cam followers and being rotatable with respect to the output shaft and the stationary sheave;

a generally cylindrical cam secured to the output shaft, the cam having one or more inclined ramps for engagement with the cam followers, the ramps functioning to urge the cam followers and therefore the movable sheave toward the stationary sheave in response to torque acting between the movable sheave and the cam; and means for normally biasing the movable sheave toward the stationary sheave.

7. The transmission system of claim 6 wherein the one-way clutch comprises a roller clutch.

8. The transmission system of claim 6 wherein the one-way clutch comprises a wrap spring.

9. The transmission system of claim 6 wherein the one-way clutch comprises a ratchet.

10. The transmission system of claim 6 wherein the cam includes one or more sets of inclined ramps against which the cam followers ride, each set including generally oppositely oriented acceleration and deceleration ramps.

11. The transmission system of claim 10 wherein each set of inclined ramps is configured generally in the shape of a V.

12. The transmission system of claim 11 wherein the deceleration ramp has a generally convex curved profile.

13. The transmission system of claim 6 wherein each cam follower comprises a roller carried by the movable sheave.

14. The transmission system of claim 13 wherein the roller includes generally convex side walls.

15. The transmission system of claim 14 wherein the side walls of the roller are tapered to a generally central point.

16. A continuously variable transmission system comprising:

a rotatable input shaft connectable to an engine of a vehicle;

a rotatable drive clutch connected to the input shaft, the drive clutch having
a laterally stationary sheave with an inner belt-engaging surface,
a laterally movable sheave with an inner belt-engaging surface,
biasing means for normally biasing the movable sheave away from the stationary sheave and for selectively moving the movable sheave toward the stationary sheave in response to rotation of the drive clutch,
a roller clutch carried on the input shaft, and
a generally cylindrical belt-engaging surface connected to the roller clutch;

a rotatable output shaft;

a rotatable split sheave driven clutch connected to the output shaft; and an endless flexible drive belt disposed about the drive and driven clutches, the belt having an inner drive surface engageable with the generally cylindrical belt-engaging surface and a pair of side drive surfaces engageable between the inner belt-engaging surfaces of the sheaves, the size of the drive belt being selected so that when the engine is at an idle speed the inner surface of the belt firmly engages the generally cylindrical belt-engaging surface connected to the roller clutch;

the roller clutch being configured and arranged to permit the cylindrical belt-engaging surface to remain substantially stationary when the input shaft is rotating, thereby permitting the belt and driven clutch to remain substantially stationary when the engine is at an idle speed.

17. The transmission system of claim 16 wherein the inner drive surface of the drive belt includes a plurality of generally V-shaped longitudinal grooves and the generally cylindrical belt-engaging connected to the roller clutch includes a plurality of complementary generally V-shaped grooves.

18. A continuously variable transmission system comprising:

an input shaft connectable to an engine of a vehicle, the input shaft being rotatable in a driving direction;

a rotatable drive clutch connected to the input shaft for rotation therewith in the driving direction, the drive clutch having
a laterally stationary sheave with an inner belt-engaging surface,
a laterally movable sheave with an inner belt-engaging surface, and biasing means for normally biasing the movable sheave away from the stationary sheave and for selectively moving the movable sheave toward the stationary sheave in response to rotation of the drive clutch;

a rotatable output shaft connectable to a drive axle of the vehicle;

a rotatable driven clutch connected to the output shaft, the driven clutch having a laterally stationary sheave with an inner belt-engaging surface, the stationary sheave being mounted to a roller clutch, which in turn is mounted to the output shaft, the roller clutch providing positive rotational engagement of the stationary sheave against the output shaft when the stationary sheave is rotated in the direction of driving rotation of the drive clutch and the input shaft, the roller clutch permitting the stationary sheave to rotate in the opposite direction with respect to the output shaft;

a laterally movable sheave with an inner belt-engaging surface, the movable sheave having one or more cam followers and being rotatable with respect to the output shaft and the stationary sheave;

a generally cylindrical cam secured to the output shaft, the cam having one or more inclined ramps for engagement with the cam followers, the ramps functioning to urge the cam followers and therefore the movable sheave toward the stationary sheave in response to torque acting between the movable sheave and the cam; and means for normally biasing the movable sheave toward the stationary sheave; and an endless flexible drive belt disposed about the drive and driven clutches, the belt having an inner drive surface and a pair of side drive surfaces.

19. A continuously variable transmission system comprising:

an input shaft connectable to an engine of a vehicle, the input shaft being rotatable in a driving direction;

a rotatable split sheave drive clutch connected to the input shaft for rotation therewith in the driving direction;

a rotatable output shaft;

a rotatable split sheave driven clutch connected to the output shaft, the driven clutch having a laterally stationary sheave mounted to a one-way clutch which in turn is mounted to the input shaft, the one way clutch providing positive rotational engagement of the stationary sheave against the output shaft when the stationary sheave is rotated in the direction of driving rotation of the drive clutch and the input shaft, the one-way clutch permitting the stationary sheave to rotate in the opposite direction with respect to the output shaft;

a laterally movable sheave having one or more cam followers and being rotatable with respect to the output shaft;

a generally cylindrical cam secured to the output shaft, the cam having one or more inclined ramps against which the cam followers may be engaged, the ramps functioning to urge the cam followers and therefore the movable sheave toward the stationary sheave in response to torque acting between the movable sheave and the cam; and means for normally biasing the movable sheave toward the stationary sheave; and an endless flexible drive belt disposed about the drive and driven clutches.

20. The transmission system of claim 19 wherein the one-way clutch comprises a roller clutch.

21. The transmission system of claim 19 wherein the one-way clutch comprises a wrap spring.

22. The transmission system of claim 19 wherein the one-way clutch comprises a ratchet.

23. The transmission system of claim 19 wherein the inclined rams are generally helical in shape.

24. The transmission system of claim 19 wherein the cam includes one or more sets of inclined ramps against which the cam followers ride, each set including generally oppositely oriented acceleration and deceleration ramps.

25. The transmission system of claim 24 wherein each set of inclined ramps is configured generally in the shape of a V.

26. The transmission system of claim 25 wherein the deceleration ramp has a generally convex curved profile.

27. The transmission system of claim 19 wherein each cam follower comprises a roller carried by the movable sheave.

28. The transmission system of claim 27 wherein the roller includes generally convex side walls.

29. The transmission system of claim 28 wherein the side walls of the roller are tapered to a generally central point.

30. A continuously variable transmission system comprising:

a rotatable input shaft connectable to an engine of a vehicle;

a rotatable split sheave drive clutch, the drive clutch including at least one belt-engaging surface;

a roller clutch disposed between the input shaft and the belt-engaging surface of the drive clutch;

a rotatable output shaft;

a rotatable split sheave driven clutch connected to the output shaft; and an endless flexible drive belt disposed about the drive and driven clutches, the belt having at least one drive surface engageable with the belt-engaging surface of the drive clutch, the size of the drive belt and the configuration of the belt-engaging surface of the drive clutch being selected so that when the engine is at an idle speed the belt firmly engages the belt-engaging surface of the drive clutch;

the roller clutch being configured and arranged to permit the belt-engaging surface of the drive clutch to remain substantially stationary when the input shaft is rotating, thereby permitting the belt and driven clutch to remain substantially stationary when the engine is at an idle speed, the roller clutch being further configured and arranged to firmly engage the drive clutch's drive surface with the input shaft when the driven clutch attempts to drive the belt faster than the speed at which the drive clutch and input shaft are rotating, thereby permitting the driven clutch to backdrive the input shaft and engine to provide engine braking to the vehicle.

31. The transmission system of claim 30 wherein the driven clutch comprises:

a laterally stationary sheave with an inner belt-engaging surface, the stationary sheave being mounted to a one-way clutch which in turn is mounted to the input shaft, the one-way clutch providing positive rotational engagement of the stationary sheave against the output shaft when the stationary sheave is rotated in the direction of driving rotation of the drive clutch and the input shaft, the one-way clutch permitting the stationary sheave to rotate in the opposite direction with respect to the output shaft;

a laterally movable sheave with an inner belt-engaging surface, the movable sheave having one or more cam followers and being rotatable with respect to the output shaft and the stationary sheave;

a generally cylindrical cam secured to the output shaft, the cam having one or more inclined ramps for engagement with the cam followers, the ramps functioning to urge the cam followers and therefore the movable sheave toward the stationary sheave in response to torque acting between the movable sheave and the cam; and means for normally biasing the movable sheave toward the stationary sheave.

32. The transmission system of claim 31 wherein the one-way clutch comprises a roller clutch.

33. The transmission system of claim 31 wherein the one-way clutch comprises a wrap spring.

34. The transmission system of claim 31 wherein the one-way clutch comprises a ratchet.

35. The transmission system of claim 31 wherein the cam includes one or more sets of inclined ramps against which the cam followers ride, each set including generally oppositely oriented acceleration and deceleration ramps.

36. The transmission system of claim 35 wherein each set of inclined ramps is configured generally in the shape of a V.

37. The transmission system of claim 36 wherein the deceleration ramp has a generally convex curved profile.

38. The transmission system of claim 31 wherein each cam follower comprises a roller carried by the movable sheave.

39. The transmission system of claim 38 wherein the roller includes generally convex side walls.

40. The transmission system of claim 39 wherein the side walls of the roller are tapered to a generally central point.

* * * * *